(12) United States Patent
Stark

(10) Patent No.: US 11,750,361 B2
(45) Date of Patent: *Sep. 5, 2023

(54) CLOCK PERIOD RANDOMIZATION FOR DEFENSE AGAINST CRYPTOGRAPHIC ATTACKS

(71) Applicant: Google LLC, Mountain View, CA (US)

(72) Inventor: Donald Stark, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 268 days.

This patent is subject to a terminal disclaimer.

(21) Appl. No.: 17/176,554

(22) Filed: Feb. 16, 2021

(65) Prior Publication Data
US 2021/0194667 A1   Jun. 24, 2021

Related U.S. Application Data

(63) Continuation of application No. 15/436,489, filed on Feb. 17, 2017, now Pat. No. 10,958,414.
(Continued)

(51) Int. Cl.
*H04L 9/00* (2022.01)
*G06F 7/58* (2006.01)

(52) U.S. Cl.
CPC .............. *H04L 9/002* (2013.01); *G06F 7/582* (2013.01); *G06F 7/588* (2013.01); *H04L 9/003* (2013.01);
(Continued)

(58) Field of Classification Search
CPC . H01L 23/57; G06F 1/06; G06F 7/582; G06F 7/588; H04L 9/002; H04L 9/003;
(Continued)

(56) References Cited

U.S. PATENT DOCUMENTS

| | | |
|---|---|---|
| 4,932,053 A | 6/1990 | Frufhauf et al. |
| 5,164,677 A | 11/1992 | Hawkins et al. |

(Continued)

FOREIGN PATENT DOCUMENTS

| | | |
|---|---|---|
| CN | 1190830 | 8/1998 |
| CN | 101542969 | 9/2009 |

(Continued)

OTHER PUBLICATIONS

"Foreign Office Action", JP Application No. 2019-208908, dated Feb. 1, 2022, 5 pages.

(Continued)

*Primary Examiner* — Oleg Korsak
(74) *Attorney, Agent, or Firm* — Colby Nipper PLLC

(57) ABSTRACT

Methods, systems, and apparatuses for defending against cryptographic attacks using clock period randomization. The methods, systems, and apparatuses are designed to make side channel attacks and fault injection attacks more difficult by using a clock with a variable period during a cryptographic operation. In an example embodiment, a clock period randomizer includes a fixed delay generator and a variable delay generator, wherein a variable delay generated by the variable delay generator is based on a random or pseudorandom value that is changed occasionally or periodically. The methods, systems, and apparatuses are useful in hardware security applications where fault injection and/or side channel attacks are of concern.

20 Claims, 11 Drawing Sheets

Conventional

Related U.S. Application Data

(60) Provisional application No. 62/298,842, filed on Feb. 23, 2016.

(52) U.S. Cl.
CPC .......... *H04L 9/004* (2013.01); *H04L 2209/08* (2013.01); *H04L 2209/12* (2013.01)

(58) Field of Classification Search
CPC .. H04L 9/004; H04L 2209/08; H04L 2209/12
See application file for complete search history.

(56) References Cited

U.S. PATENT DOCUMENTS

| | | | |
|---|---|---|---|
| 5,404,402 | A | 4/1995 | Sprunk |
| 6,930,954 | B2 | 8/2005 | Imamiya et al. |
| 6,987,405 | B1 | 1/2006 | Reaves |
| 8,266,194 | B2 | 9/2012 | Kaluzhny |
| 8,971,447 | B1 | 3/2015 | Kao et al. |
| 9,046,552 | B2 | 6/2015 | Paillet et al. |
| 10,958,414 | B2 * | 3/2021 | Stark .................. H04L 9/002 |
| 2002/0093872 | A1 | 7/2002 | Tomita |
| 2003/0210101 | A1 | 11/2003 | McCorquodale et al. |
| 2003/0231122 | A1 | 12/2003 | Cockburn et al. |
| 2005/0231296 | A1 | 10/2005 | Souetinov et al. |
| 2009/0163166 | A1 | 6/2009 | Lin |
| 2010/0007398 | A1 | 1/2010 | Zhang et al. |
| 2011/0074509 | A1 | 3/2011 | Samavedam et al. |
| 2011/0285420 | A1 | 11/2011 | Deas et al. |
| 2011/0296202 | A1 | 12/2011 | Henry et al. |
| 2013/0222067 | A1 | 8/2013 | Yin et al. |
| 2013/0285729 | A1 | 10/2013 | Xu et al. |
| 2014/0225110 | A1 | 8/2014 | Nayak et al. |
| 2017/0244546 | A1 | 8/2017 | Stark |

FOREIGN PATENT DOCUMENTS

| | | |
|---|---|---|
| CN | 103378828 | 10/2013 |
| CN | 107735981 | 2/2018 |
| GB | 2513987 | 11/2014 |
| JP | H07239837 | 9/1995 |
| JP | 2001126480 | 5/2001 |
| JP | 2003178589 | 6/2003 |
| JP | 2003337750 | 11/2003 |
| JP | 2007248380 | 9/2007 |
| JP | 2008113130 | 5/2008 |
| KR | 20120095699 | 8/2012 |
| WO | 2015145487 | 10/2015 |
| WO | 2016178826 | 11/2016 |
| WO | 2017147116 | 8/2017 |

OTHER PUBLICATIONS

"Application Note // Hardware GZIP Decompression", Internet article; As cited in search report for PCT application PCT/US2016/0238630 dated Nov. 10, 2016, 2003, p. 7.
"Final Office Action", U.S. Appl. No. 15/436,489, dated Apr. 15, 2019, 17 pages.
"Foreign Office Action", Japanese Application No. 2018525379, Nov. 6, 2018, 6 pages.
"Foreign Office Action", CN Application 201780000669.2, dated Dec. 8, 2020, 9 pages.
"Foreign Office Action", Chinese Application No. 201780000669.2, dated Apr. 9, 2020, 42 pages.
"Foreign Office Action", Japanese Application No. 2018525379, dated Jul. 9, 2019, 6 pages.
"International Preliminary Report on Patentability", PCT Application No. PCT/US2017/018813, dated Aug. 28, 2018, 10 pages.
"Non-Final Office Action", U.S. Appl. No. 15/436,489, dated Dec. 18, 2018, 17 pages.
"Notice of Allowance", U.S. Appl. No. 15/436,489, filed Dec. 1, 2020, 8 pages.
"Written Opinion", PCT Application No. PCT/US2017/018813, dated Aug. 31, 2017, 9 pages.
"Written Opinion", PCT Application No. PCT/US2016/028630, dated Nov. 10, 2016, 6 pages.
Aoyama, et al., "3Gps, 5000ppm Spread Spectrum SerDes PHY with frequency tracking Phase Interpolator for Serial ATA", 2003 Symposium on VLSI Circuits Digest of Technical Papers, pp. 107-110.
Asai, et al., "A Countermeasure Against Side Channel Attack on Cryptographic LSI Using Clock Variation Mechanism", 2013, 11 pages.
Bar-El, et al., "The Sorcerer's Apprentice Guide to Fault Attacks", Proceedings of the IEEE 94, No. 2, 13 pages.
Bayrak, et al., "An EDA-Friendly Protection Scheme Against Side-Channel Attacks", 2013 Design, Automation & Fest in Europe Conference & Exhibition, US, IEEE, Mar. 18, 2013, 8 pages.
Bialek, et al., "Implementation of a Digital Trim Scheme for SAR ADCs", Adv. Radio Sci. 11, www.adv-radio.sci.net/11/227/2013/ doi: 10.5194/ars-11-227-2013, 2013, 4 pages.
Horinouchi, et al., "Variation of Fault Attack Possibility with Jitter in Synchronization Signal Leaked Through Side-Channel of AES Circuit", SCIS2016[USB], Japan, Jan. 19, 2016, 2F3-3, pp. 1-7, 12 pages.
Kocher, et al., "Timing Attacks on Implementations of Diffie-Hellman, RSA, DSS, and Other Systems", In Annual International Cryptology Conference, Jul. 13, 2001, 10 pages.
Saeki, et al., "A 2.5-ns Clock Access, 250-MHz, 256-Mb SDRAM with Synchronous Mirror Delay", IEEE Journal of Solid-State Circuits 31, No. 11, pp. 1656-1668.
Sidiropoulos, et al., "A Semidigital Dual Delay-Locked Loop", IEEE Journal of Solid-State Circuits 32, No. 11, Nov. 11, 1997, pp. 1683-1692.
Zafar, et al., "A Novel Countermeasure Enhancing Side Channel Immunity in FPGAs", cited in search report of PCT Application PCT/US2017/018813 dated May 5, 2017, Oct. 10, 2008, 3 pages.
Zafar, et al., "A Novel Countermeasure Enhancing Side Channel Immunity in FPGAs", 2008 International Conference on Advances in Electronics and Micro-electronics, US, IEEE, Sep. 29, 2008, pp. 132-137, 8 pages.
"Corrected Notice of Allowance", U.S. Appl. No. 15/436,489, filed Feb. 24, 2021, 2 pages.
"Foreign Office Action", GB Application No. 1717083.8, dated Apr. 28, 2021, 5 pages.
"Foreign Office Action", JP Application No. 2019-208908, dated May 18, 2021, 11 pages.

* cited by examiner

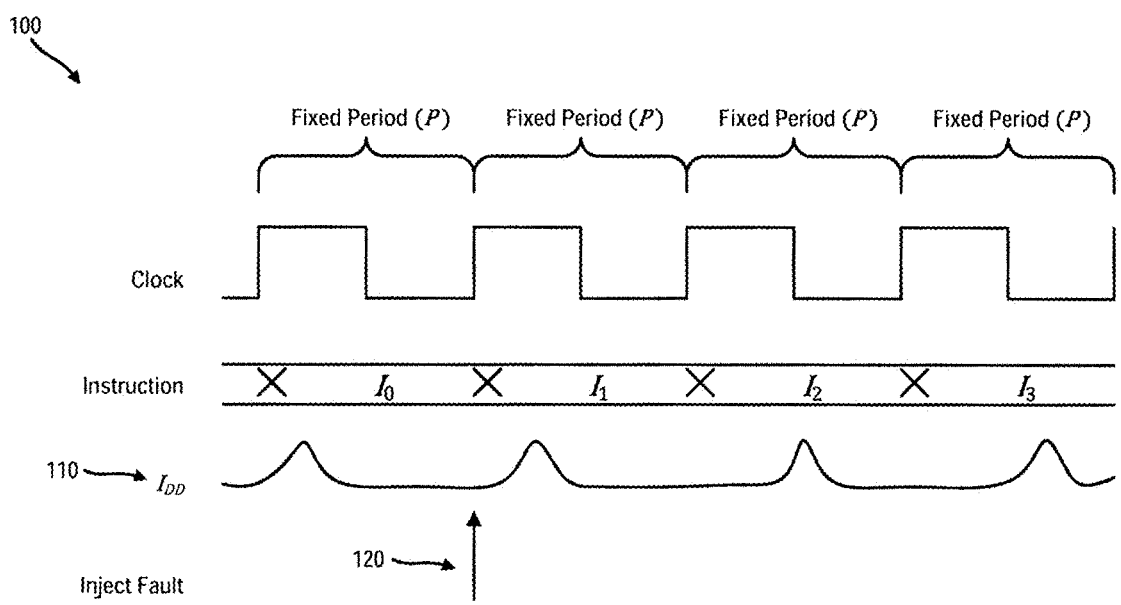
Conventional
FIG. 1

CLOCK PERIOD RANDOMIZATION FOR DEFENSE AGAINST CRYPTOGRAPHIC ATTACKS

CROSS-REFERENCE TO RELATED APPLICATIONS

The present application is a continuation of, and claims priority to, U.S. patent application Ser. No. 15/436,489, filed Feb. 17, 2017, which, in turn, claims priority to U.S. Provisional Patent Application No. 62/298,842, filed Feb. 23, 2016, the disclosures of which are incorporated by reference herein in their entirety.

BACKGROUND

Many computing systems use cryptography to implement secure communication between entities. Modern cryptographic systems typically rely on keys, some of which must be kept secret from the outside world in order to maintain security. Numerous approaches have been proposed and implemented for extracting these keys clandestinely.

Two categories of cryptographic attacks are side-channel attacks and fault injection attacks. In a side-channel attack, the attacker monitors the device executing the cryptographic algorithm. For example, during execution, the device's power consumption, electromagnetic radiation, and/or acoustic emission may provide an attacker with information regarding data processed and instructions executed because instructions may provide a characteristic signature when operating on particular data. If the attacker has access to the device and iteratively varies the inputs, information regarding the private key can be gleaned. Knowing the particular cryptographic algorithm and its weakness to a fault injection attack, with only a feasible amount of repetition, the attacker may be able to deduce the cryptographic key.

In a fault injection attack, the attacker injects a fault into execution and monitors the outcome. Fault injections include varying the power supply, altering the device's clock period, altering the temperature, or using light, laser, x-rays, or ions to cause a fault. For example, varying the power supply may cause a glitch resulting in an instruction skip. Skipping a conditional jump instruction could bypass an important security check. Varying the clock may result in a data misread (e.g., reading a value from the data bus before memory had provided the appropriate value to the bus) or an instruction miss (e.g. a circuit begins executing an instruction before the processor finishes completing the previous instruction). In another example, because RAM may have one temperature tolerance for a write and a different temperature tolerance for a read, changing the temperature to a number between these two temperature tolerances will put the device in a state where data can be written to, but not read from, RAM, or vice versa, depending on which temperature tolerance is higher.

If a cryptographic attack is able to extract the secret key from a device, the device's security is compromised. Therefore, it is desirable to make the attack process as difficult as possible.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to methods and systems for protecting the security of data. More specifically, aspects of the present disclosure relate to protecting against cryptographic attacks using clock period randomization.

In general, one aspect of the subject matter described in this specification can be embodied in an apparatus randomly varying a device clock during cryptographic operation, the apparatus comprising: an input clock; and a clock period randomizer, the clock period randomizer generating a variable clock period that varies randomly to produce an output variable clock driving the device at a random clock rate at least during cryptographic operation.

In at least one embodiment, the clock period randomizer includes: a circuit including a variable capacitor; and a switch configured to switch the variable capacitor into or out of the circuit, the switch controlled by a trim code, wherein the circuit is configured to change a clock signal from low to high or from high to low based on an operation of the switch.

In at least one embodiment, the apparatus further comprises a trim code generator to generate the trim code, the trim code generator including a random number generator to generate a random number or a pseudorandom number.

In at least one embodiment, the trim code generator includes a bank of registers, each register holding a trim code.

In at least one embodiment, the trim code generator includes a linear feedback shift register.

In at least one embodiment, the circuit further includes: a fixed delay generator including an inverter, a resistor, and a capacitor; a variable delay generator including an inverter, a resistor, and the variable capacitor; a logic gate connected to the fixed delay generator and to the variable delay generator, the logic gate to output the clock signal having the variable clock period.

In at least one embodiment, the clock period randomizer includes: a fixed delay generator that generates a fixed delay; a variable delay generator that generates a variable delay; and a trim code generator configured to control the variable delay generator, wherein a clock signal has a variable period set by the fixed delay and the variable delay.

In at least one embodiment, the variable delay generator includes a first delay unit and a second delay unit, wherein the first delay unit includes first circuitry configured to generate a delay and a first mux configured to switch the first circuitry into and out of a circuit, wherein the first mux is controlled by a trim code generated by the trim code generator, wherein the second delay unit includes second circuitry configured to generate a delay and a second mux configured to switch the second circuitry into and out of a circuit, wherein the second mux is controlled by a trim code generated by the trim code generator, and wherein the trim code generator includes a random number generator that generates a random number or a pseudorandom number.

In at least one embodiment, the fixed delay is determined based on a minimum delay of the variable delay generator.

In at least one embodiment, a sum of the fixed delay and the minimum delay of the variable delay generator satisfies a minimum clock period of an associated device.

In at least one embodiment, an upper bound of a sum of the fixed delay and the minimum delay of the variable delay generator satisfies a predetermined performance threshold of an associated device.

In at least one embodiment, the clock period randomizer includes: a fixed delay generator that generates a fixed delay; and a variable delay generator that generates a variable delay, the variable delay generator including a varactor having a bottom plate, wherein the variable delay is generated by varying a voltage to the bottom plate of the varactor, and wherein a clock signal has a variable period set by the fixed delay and the variable delay.

In at least one embodiment, the clock period randomizer includes: a fixed delay generator that generates a fixed delay; and a variable delay generator that generates a variable delay, the variable delay generator including a phase interpolator that generates the variable delay, wherein a clock signal has a variable period set by the fixed delay and the variable delay.

In at least one embodiment, the variable delay generator includes circuitry configured to generate a delay and a mux configured to switch the circuitry into and out of a circuit, wherein the mux is controlled by a trim code generated by the trim code generator, and wherein the trim code generator includes a random number generator that generates a random number or a pseudorandom number.

In at least one embodiment, a controller provides the trim code to the switch synchronously based on the input clock.

In at least one embodiment, the clock period randomizer includes: a digital to analog converter (DAC); a voltage regulator that receives an input reference that varies on a cycle by cycle basis; and 2n+1 inverters in series, the inverters driven by a signal output by the voltage regulator, wherein n is an integer greater than zero.

In at least one embodiment, the variable capacitor is a linear capacitor.

In at least one embodiment, the variable capacitor is a nonlinear capacitor.

In at least one embodiment, the clock period randomizer further includes a plurality of switches, wherein the circuit further includes a plurality of substantially identical variable capacitors, and wherein trim codes applied to the substantially identical variable capacitors are based on a unary coding.

In at least one embodiment, the clock period randomizer further includes a plurality of switches, wherein the circuit further includes a plurality of variable capacitors, and wherein trim codes applied to the variable capacitors are binary-weighted.

In at least one embodiment, the clock period randomizer further includes a plurality of switches, wherein the circuit further includes a first variable capacitor and a second variable capacitor, and wherein a first trim code applied to the first variable capacitor is a binary-weighted trim code, and wherein a second trim code applied to the second variable capacitor is based on a unary coding.

In general, one aspect of the subject matter described in this specification can be embodied in a method of generating a variable clock period for a clock signal of a device at least during a cryptographic operation to defend against a cryptographic attack, the method comprising: generating, by a fixed delay generator, a fixed delay; generating, by a variable delay generator, a variable delay; generating, by a random number generator, a random number or a pseudorandom number; controlling an amount of the variable delay based on the random number or the pseudorandom number; controlling a variable period of a clock signal based on the fixed delay and the variable delay; and driving the device at the variable clock period at least during cryptographic operation.

In at least one embodiment, a sum of the fixed delay and a minimum amount of the variable delay is greater than or equal to a minimum clock period of an associated device.

In at least one embodiment, a sum of the fixed delay and a maximum amount of the variable delay is less than or equal to a predetermined performance threshold of the associated device.

In general, one aspect of the subject matter described in this specification can be embodied in a method of randomizing a clock period for a clock of an associated device at least during a cryptographic operation to defend against a cryptographic attack, the method comprising: determining a set of trim codes, the set including at least a first trim code and a second trim code; generating, by physical electronic hardware, a random number or a pseudorandom number; selecting, based on the random number or the pseudorandom number, the first trim code from the set of trim codes; selecting, based on the random number or the pseudorandom number, the second trim code from the set of trim codes; providing the first trim code to a variable delay generator, the variable delay generator including elements that operate based on any trim code from the set of trim codes; and providing the second trim code to the variable delay generator, wherein when the first trim code is provided to the variable delay generator, a clock period of the associated device is a first amount of time, wherein when the second trim code is provided to the variable delay generator, a clock period of the associated device is a second amount of time, and wherein the first amount of time is greater than the second amount of time.

In at least one embodiment, the variable delay generator has a minimum delay, wherein a fixed delay generator has a fixed delay, wherein the fixed delay contributes to a length of the clock period of the associated device, and wherein a sum of the fixed delay and the minimum delay of the variable delay generator is greater than or equal to a minimum clock period of the associated device.

In at least one embodiment, the sum of the fixed delay and the minimum delay of the variable delay generator is less than or equal to a predetermined performance threshold of the associated device.

In at least one embodiment, the first amount of time is at least 1% greater than the second amount of time.

Embodiments of some or all of the processor and memory systems disclosed herein may also be configured to perform some or all of the method embodiments disclosed above. Embodiments of some or all of the methods disclosed above may also be represented as instructions embodied on non-transitory processor-readable storage media such as optical or magnetic memory. In addition, the systems of the present disclosure may alternatively be implemented in dedicated hardware that perform cryptographic functions such as, for example, Advanced Encryption Standard (AES), Secure Hash Algorithm (SHA), and the like.

Further scope of applicability of the methods and systems of the present disclosure will become apparent from the Detailed Description given below. However, it should be understood that the Detailed Description and specific examples, while indicating embodiments of the methods and systems, are given by way of illustration only, since various changes and modifications within the spirit and scope of the concepts disclosed herein will become apparent to those skilled in the art from this Detailed Description.

BRIEF DESCRIPTION OF THE DRAWINGS

These and other objects, features, and characteristics of the present disclosure will become more apparent to those skilled in the art from a study of the following Detailed Description in conjunction with the appended claims and drawings, all of which form a part of this specification. In the drawings:

FIG. 1 is a block diagram illustrating examples of conventional cryptographic attacks on a processing device.

Figure 2:
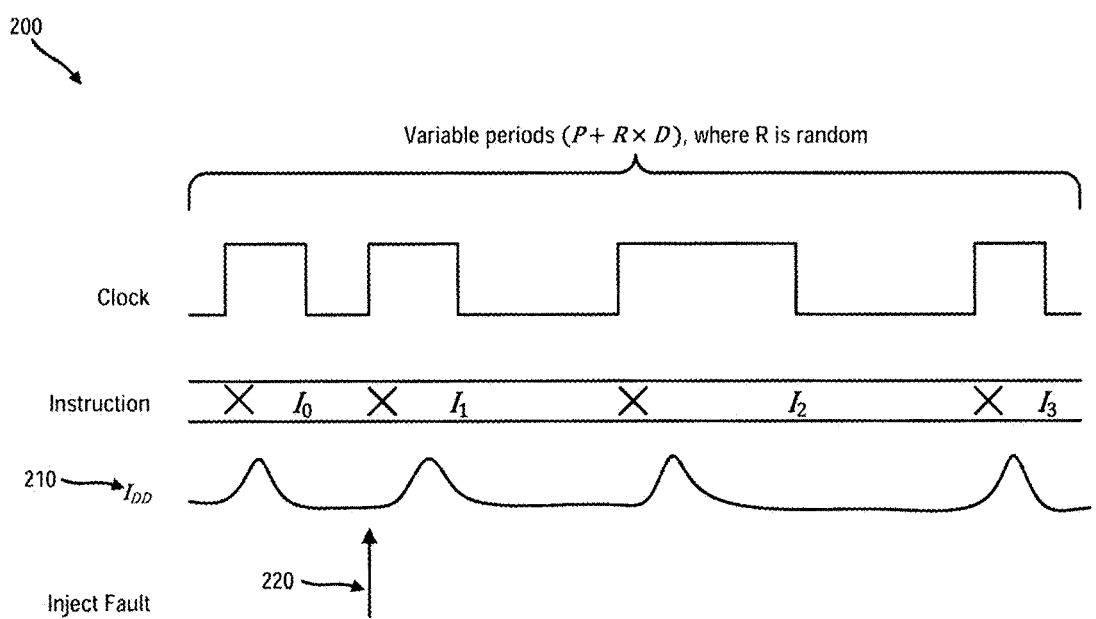
FIG. 2 is a block diagram illustrating example effects of using clock period randomization to defend against cryptographic attacks according to one or more embodiments described herein.

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments of the methods and systems of the present disclosure will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include other features not described in detail herein. Additionally, some well-known structures or functions may not be shown or described in detail below, so as to avoid unnecessarily obscuring the relevant description.

As described above, modern computing systems use cryptography to provide secure communication between different entities, and the cryptographic techniques implemented may rely on secret keys. The reliance on these secret keys has prompted the development of various methods for attacking such systems and extracting the keys in a clandestine manner.

As recognized by the inventors, a device operating with a clock having a fixed period makes it easier to conduct cryptographic attacks, including side channel attacks and fault injection attacks. Randomizing the clock period of the device makes the cryptographic attack more difficult. For example, determination of bits of a cryptographic key is at least partially based on knowing the length of the clock period; therefore, a randomized clock period makes a cryptographic attack more difficult.

FIG. 1 illustrates example attacks conventionally performed on processing devices. In the example arrangement 100 shown, a processor is executing code that implements a cryptographic algorithm such as, for example, Advanced Encryption Standard (AES). As the processor executes successive instructions $I_0$, $I_1$, $I_2$, etc., the processor will draw a supply current ($I_{DD}$) 110 that is a function both of the instruction being executed and of the data being processed. In another example scenario, the supply current 110 may be drawn as a result of dedicated AES hardware executing instructions. By analyzing this signature and observing how the signature changes under different inputs, it may be possible to obtain information regarding, and eventually deduce, the cryptographic key or, generally, any other value or object of interest to an attacker. Analysis may also be performed by measuring the electromagnetic radiation (EMR) or acoustic emission of the device rather than the power supply. This type of approach (e.g., analyzing the power supply or the EMR of the device) is generally referred to as a side channel attack.

Another class of attacks aims to disrupt the device by causing the processor to malfunction, by manipulating the power supply, altering the device's clock period, altering the temperature, or using light, laser, x-rays, or ions to disturb the device during operation. These attacks are typically referred to as fault injection attacks 120, and they rely on providing a disturbance at a particular point in time, such as when the processor is executing a branch or jump instruction.

As discussed above, if a cryptographic attack is able to extract the cryptographic key from a system or device, then the security of the system or device becomes compromised.

Accordingly, the methods and systems of the present disclosure are designed to make the process of attacking a device or system more difficult. As will be described herein, embodiments of the present disclosure utilize a randomized, pseudorandomized, or variable clock period to protect the device against cryptographic attacks. For example, side channel attacks and fault injection attacks may rely on a relatively consistent clock period. As such, instead of using a clock with a fixed period, P, the methods and systems of the present disclosure provide or include a clock with a variable period.

In an example embodiment, a variable period of the clock may be represented as P+R×D, where P is a fixed period, D is a constant delay, and R is a random or pseudorandom value. In an example embodiment, R may be a value in, for example, the interval [0 . . . 1]. In an example embodiment, the value of R may differ in one clock cycle from another clock cycle. In another example embodiment, R may vary with each clock cycle. In an example embodiment, R may change every $k^{th}$ clock cycle, where k is a positive integer. In another example embodiment, R may vary with different clock cycles, but there need not be a same number of cycles between cycles in which R changes each time R changes.

FIG. 2 illustrates example effects of using clock period randomization to defend against cryptographic attacks in accordance with one or more embodiments described herein. The clock periods in FIG. 2 could be defined in terms of P+R×D, as discussed above. However, randomizing a clock period makes a cryptographic attack more difficult as the attacker will not have prior knowledge of R for each time R changes. In the case of a side channel attack, an attacker might compare a present measurement with a prior measurement, but the comparison will be frustrated without knowing the length of the corresponding clock cycles. The difficulty is compounded when an attack requires an iterative process to determine the bit values of a private key. In the case of a fault injection attack, a certain attack for a given cryptographic algorithm may require fault injection immediately prior to execution of a certain instruction. Where an attack requires a fault injected in a $k^{th}$ clock cycle occurring at time $t_k$, a randomized clock period makes it difficult to determine when is $t_k$ or what instruction executes at $t_k$. Again, the difficulty is compounded when the attack requires multiple iterations.

In FIG. 2, a side channel attack might monitor supply current $I_{DD}$ 210. However, the side channel attack based on power analysis is frustrated by reduced knowledge regarding which instruction is being executed at the time of measurement. Even with known power (or emission) signatures for a given set of (instruction, data) pairs, finding a match for one of the various pairs might include attempting various time warp factors along with various time windows. The problem of finding the time $t_k$ in which to inject a fault 220 also becomes more difficult.

Among numerous other uses and applications, the methods, apparatuses, and systems of the present disclosure may be used, for example, in hardware security applications where fault injection and/or differential side channel attacks are of concern. While there exist approaches for defending against side channel and fault injection attacks, none of the approaches provide or include clock period randomization in the manner provided in the methods and systems of the present disclosure.

As used herein, embodiments implementing "random", "randomness", "randomization", "randomly", etc. may do so using "pseudorandom", "pseudorandomness", "pseudo-randomization", "pseudorandomly", etc., as would be recognized by one having ordinary skill in the art.

Figure 3:
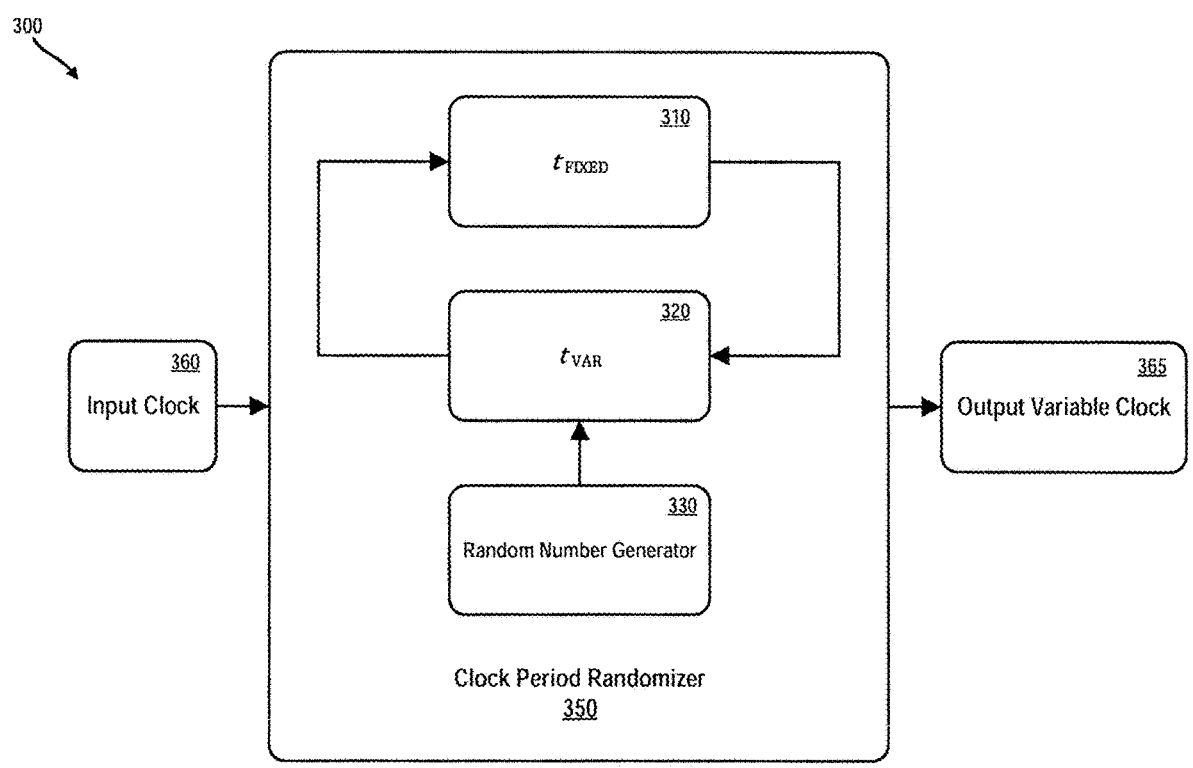
FIG. 3 is a block diagram illustrating an example high-level system for defending against cryptographic attacks using clock period randomization according to one or more embodiments described herein.

FIG. 3 illustrates an example high-level system 300 for defending against cryptographic attacks using clock period randomization. A device (not shown), such as an integrated circuit, a chip, or a system on a chip, provides operations, including secure operations, including cryptographic operations such as encrypted communications. The device is driven, or clocked, by an input clock 360 to provide the operations. System 300 randomizes the device clock speed, at least during secure operation, to protect against cryptographic attacks. In accordance with at least one embodiment, the system 300 may include clock period randomizer 350 comprising a fixed delay generator generating $t_{FIXED}$ 310, a variable delay generator generating $t_{VAR}$ 320, and a random number generator 50. In an example embodiment, the variable delay generator generating $t_{VAR}$ 320 may be a controllable variable delay generator. An input clock 360 is provided to the clock period randomizer 350. In at least one embodiment, the input clock 360 will have a fixed period, barring negligible jitter accounted for during design of a greater system or computing device in which the high-level system 300 may be integrated. The clock period randomizer 350 outputs variable clock 365, which is a variable clock signal driving operation speeds of a device in which system 300 it is integrated.

In an example embodiment, the fixed delay generator generating $t_{FIXED}$ 310 may be included in a circuit that generates a delay of $t_{FIXED}$ 310. In an example embodiment, the variable delay generator generating $t_{VAR}$ 320 may be included in a circuit that generates a delay of $t_{VAR}$ 320. In an example embodiment, the variable delay generator generating $t_{VAR}$ 320 may be controlled based on an output of the random number generator 50, the output being a random number or a pseudorandom number.

Figure 5:
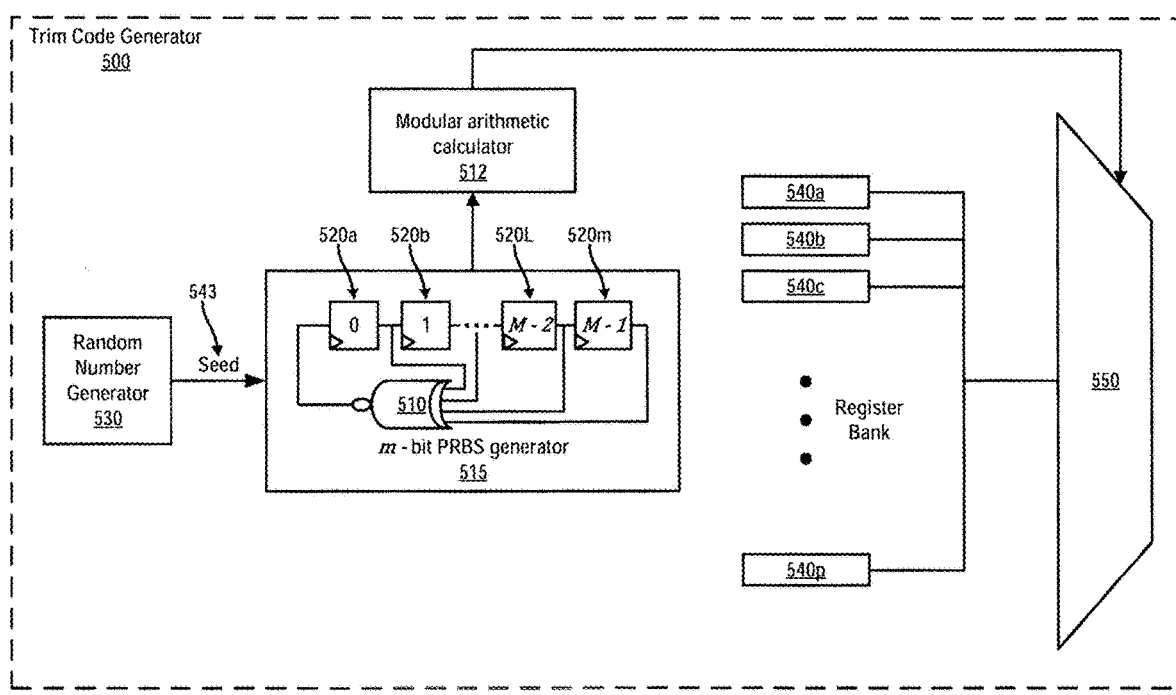
FIG. 5 is a block diagram illustrating an example system for generating trim codes according to one or more embodiments described herein.

In an example embodiment, the variable delay generator generating $t_{VAR}$ 320 may be controlled based on an output of the trim code generator 500 (FIG. 5). In an example embodiment, the fixed delay generator generating $t_{FIXED}$ 310, the variable delay generator generating $t_{VAR}$ 320, and the random number generator may be connected.

In an example embodiment, the variable delay generator generating $t_{VAR}$ 320 (FIG. 3) may include inverter 430a (FIG. 4), resistor 445a, and variable capacitor 440a.

In an example embodiment, the fixed delay generator generating $t_{FIXED}$ 310 (FIG. 3) may include capacitor 420 (FIG. 4), resistor 415a, and capacitor 425a. In an example embodiment, the random number generator 50 may be part of the trim code generator 500 (FIG. 5).

Figure 7:
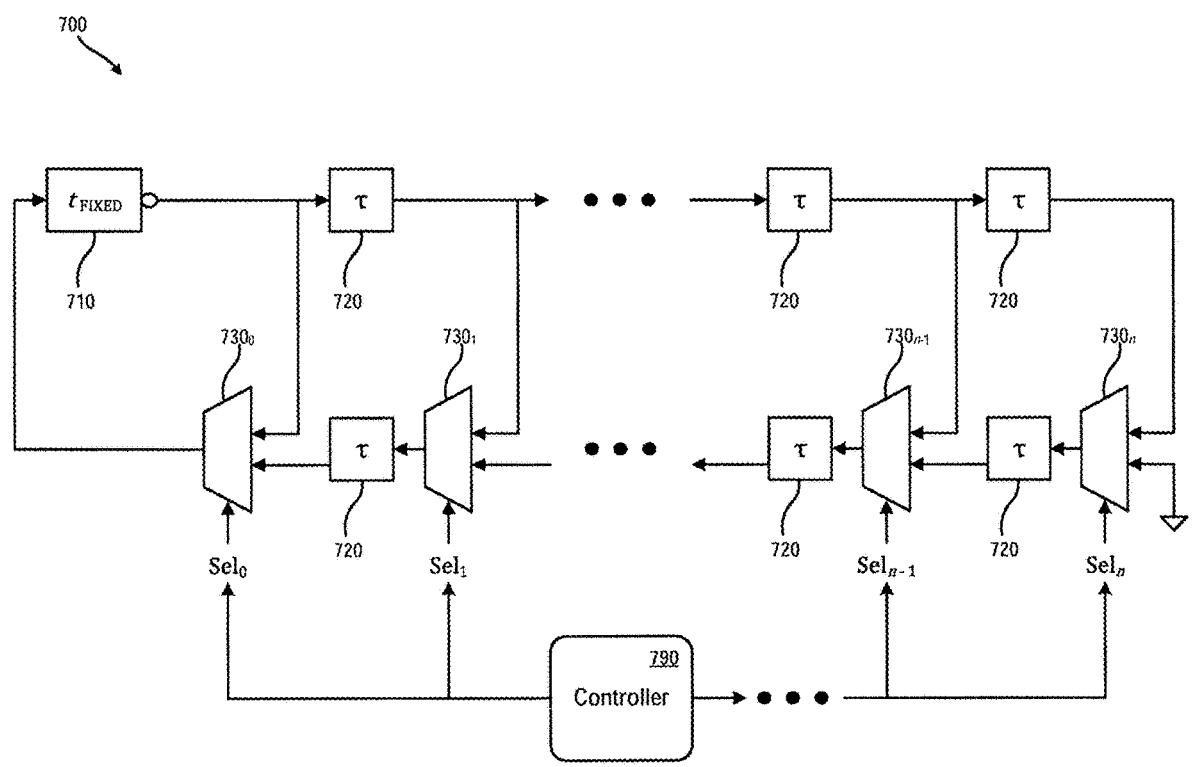
FIG. 7 is a block diagram illustrating an example system for generating clock period randomization including a synchronous mirror delay according to one or more embodiments described herein.

In an example embodiment, the fixed delay generator generating $t_{FIXED}$ 310 (FIG. 3) may be $t_{FIXED}$ generator 710 (FIG. 7). In an example embodiment, the variable delay generator generating $t_{VAR}$ 320 may include a tau (τ) delay generator 720 and a mux to switch the tau (τ) delay generator 720 into or out of the circuit comprising the variable delay generator generating $t_{VAR}$ 320.

In an example embodiment, input clock 360 (FIG. 3) may have a period of length P. (In reality, P will have a non-zero amount of jitter, but for the purpose of a high-level description, P can be deemed consistent from one clock cycle to the next.) In an example embodiment, output variable clock 365 may have a period of length P+R×D, where R is a random or pseudorandom variable and D is a constant.

For appropriate operation of the system 300 (FIG. 3) in a device, the fixed delay 310 should be at least the minimum period (e.g., highest frequency) that the device can support. The variable delay 320 may be bounded by some maximum value $t_{MAX}$. It should be noted that larger values of $t_{MAX}$ might make side channel and fault injection attacks less likely to succeed, but might also lower system performance by lowering the effective clock frequency. In accordance with at least one embodiment, the variable delay 320 is set by means of an analog or digital control signal. The implementation of variable delay 320 (FIG. 3) may include a ring oscillator, but other implementations are possible. System 300 may be an integral part of, or embedded in, a variety of devices to provide security therefor, such devices including for example an security integrated circuit (also known as a security "chip"), a system on a chip (also known as "SoC"), or a computing or communication device.

The random number generator 50 may be, for example, a true random number generator (TRNG) that measures some random parameter or event in a system or device in which the system 300 is an integral part of or embedded in, a pseudorandom number generator such as a linear feedback shift register, some combination thereof, or some other implementation providing randomness or pseudorandomness.

In accordance with one or more embodiments of the present disclosure, the implementation details of the system may vary from those of the example system 300 shown in FIG. 3. For example, any implementation of variable delay $t_{VAR}$ 320 will have a certain minimum delay. This minimum delay may be considered when designing the fixed delay $t_{FIXED}$ 310.

The output variable clock 365 is lower-bounded by the maximum frequency of the device for which the clock period randomizer generates the variable clock period. In some devices, e.g. those using dynamic voltage scaling and/or dynamic frequency scaling, the maximum frequency of the clock is itself variable. As the maximum frequency varies, the lower bound for output variable clock 365 will also vary. Therefore, where the variable period is represented as P+R×D and R is a value in the interval [0 . . . 1], P is lower-bounded by the maximum frequency of the device for which the clock period randomizer generates the variable clock period.

Figure 4:
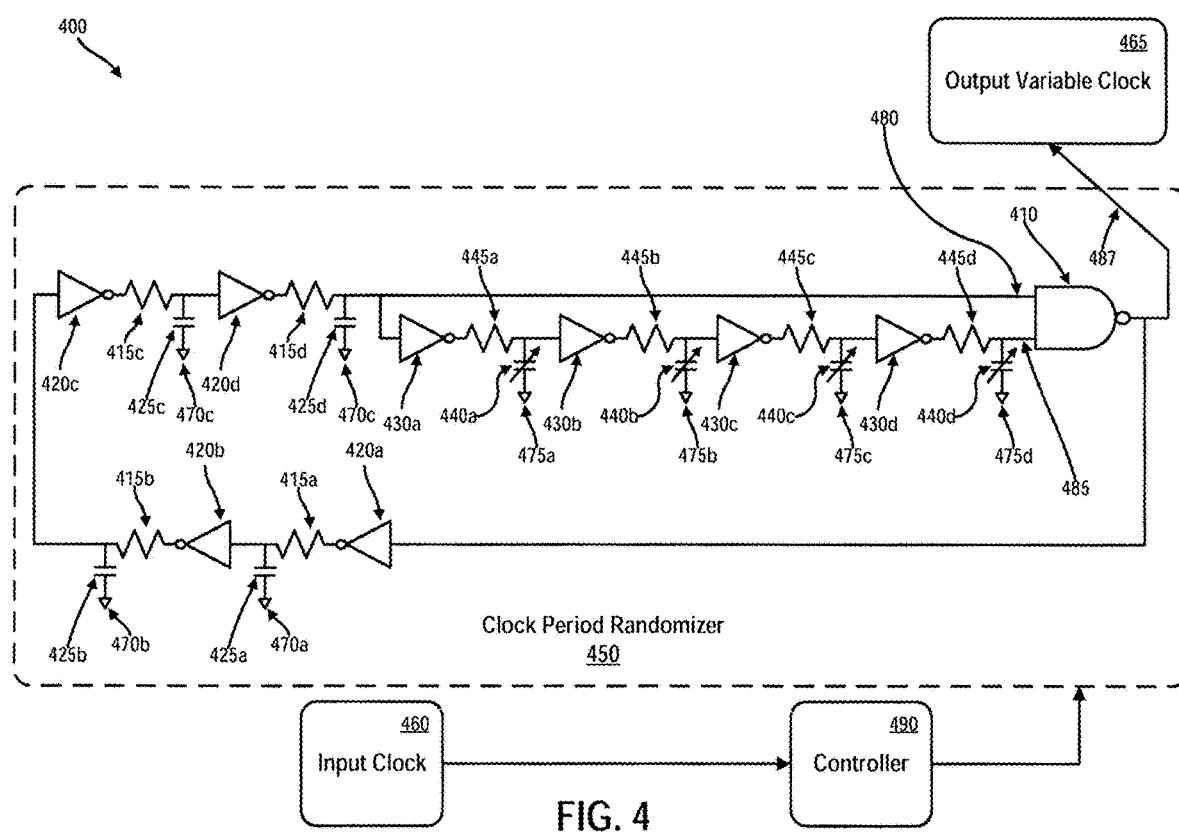
FIG. 4 is a circuit diagram illustrating an example system for generating clock period randomization including an arrangement of inverters, variable capacitors, and a logic gate according to one or more embodiments described herein.

FIG. 4 illustrates an example system 400 for generating clock period randomization including an arrangement of inverters, variable capacitors, and a logic gate. FIG. 4 includes logic gate 410, resistors 415a-415d, inverters 420a-420d, capacitors 425a-425d, inverters 430a-430d, variable capacitors 440a-440d, resistors 445a-445d, clock period randomizer 450, input clock 460, output variable clock 465, signal ground 470a-470d, signal ground 475a-475d, fixed delay wire 480, variable delay wire 485, output variable clock wire 487, and controller 490. Controller 490 may comprise a trim code generator 500 (FIG. 5). Alternatively, the controller 490 may be connected to a trim code generator 500 to receive at least one trim code from the trim code generator 500. The controller 490 provides the at least one trim code to the variable capacitors 440a-440d.

In the example embodiment depicted in FIG. 4, the bulk of a fixed delay $t_{FIXED}$ 310 (FIG. 3) is provided by the combination of the four inverters 420a-420d, resistors 415a-415d, and capacitors 425a-425d. Variable delay may, for example, be provided by pushing out the falling edge of the clock. For example, this variable delay may be implemented by the combination of four inverters 430a-430d, four resistors 445a-445d, and four variable capacitors 440a-440d. The four resistors 445a-445d and four variable capacitors 440a-440d may provide a variable delay based on the time constant they implement, and implementing this time constant may include the application of at least one trim code. At least one trim code may be changed in different cycles to implement a variable delay $t_{VAR}$ 320.

FIG. 4 depicts logic gate 410 as a NAND gate, but embodiments are not limited thereto. In another example embodiment, the clock period randomizer can be implemented with logic such as a NOR gate instead of a NAND gate.

In an example embodiment, the system 400 may operate in the following manner. Input clock 460 provides a clock signal to controller 490. In at least one embodiment, the input clock 460 may be a clock with a fixed period, barring a negligible amount of jitter, and the input clock 460 may drive a device in which the clock period randomizer 450 is integral with or embedded in. In at least one embodiment, during execution of a cryptographic algorithm or during a procedure wherein security is desired, the input clock 460 may drive, or provide clock to, the clock period randomizer 450 so that the clock period randomizer 450 operates to provide output variable clock 465. In at least one embodiment, the output variable clock 465 may provide a variable clock signal that drives circuitry or a processor that executes operations for which security is desired.

The controller 490 provides a control signal to variable capacitors 440a-440d. The control signal may comprise at least one trim code.

In embodiments based on FIG. 4, the clock period randomizer 450 comprises both capacitors 470a-470d and variable capacitors 445a-445d. One advantage of a design, in at least one embodiment, is that a trim code may be provided to the variable capacitors 440a-440d by the controller 490 synchronously. That is, the input clock 460 and the controller 490 that provides a trim code to the variable capacitors 440a-440d may have a synchronous system design.

Because the variable delay chain (inverters 430a-430d, resistors 445a-445d, variable capacitors 475a-475d) is controlled according to the control signal, the time constant T of the variable delay chain varies based on the control signal. Therefore, the voltage at the variable delay wire 485 input to the logic gate 410 from the variable delay chain will vary based on the control signal. Once the voltage from the fixed delay wire 480 and the voltage from the variable delay wire 485 reach logic gate 410, logic gate 410 implements a change in the clock signal from high to low or low to high via output variable clock wire 487, resulting in output variable clock 465. Signal ground 470a-470d and signal ground 475a-475d provide a reference voltage to each stage in the circuit. The control signal 490 provides the randomness or pseudorandomness to the clock period randomizer 450 to implement a random or pseudorandom variance in τ.

Clock period randomizer 450 as depicted in FIG. 4 includes four instances of a set comprising an inverter, a resistor, a capacitor, and a signal ground. Further, clock period randomizer 450 as depicted in FIG. 4 includes four instances of a set comprising an inverter, a resistor, a variable capacitor, and a signal ground. However, the embodiments are not limited thereto. A person having ordinary skill in the art will recognize that the numbers of the sets may vary as a function of design parameters or preferences.

Figure 10:
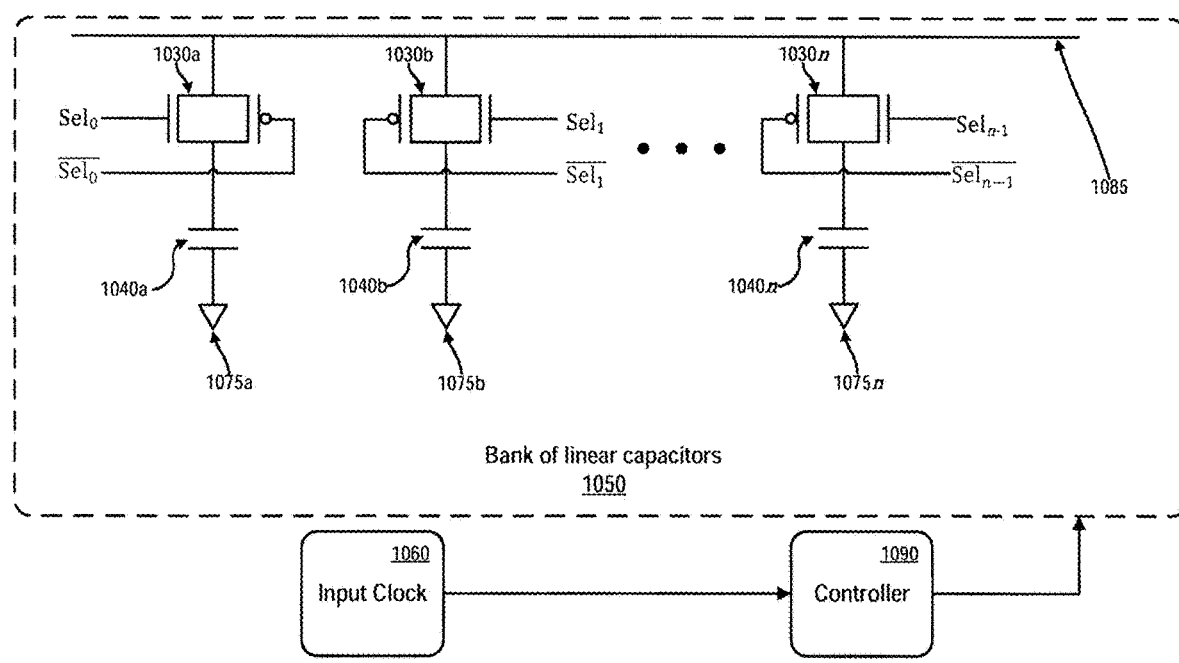
FIG. 10 is a circuit diagram illustrating a bank of linear capacitors that may be switched into or out of a circuit according to at least one embodiment.

In at least one embodiment, variable capacitors 440a-440d may be implemented as a bank of linear capacitors (e.g., as illustrated in FIG. 10 and described in greater detail below). In this embodiment, the control signals to capacitors 440a-440d may operate one or more switches that switch capacitors 440a-440d into/out of the circuit. In this embodiment, care should be taken to update the capacitor settings only when there is not a pulse traversing the fixed delay chain (inverters 420a-420d, resistors 415a-415d, capacitors 425a-425d) so that the output variable clock 465 does not glitch.

In at least one other embodiment, variable capacitors 440a-440d may be implemented as varactors where the bottom plate voltage is varied. In an embodiment, the control signal to variable capacitors 440a-440d may operate to vary the voltage to the bottom plates of the varactors.

Figure 11:
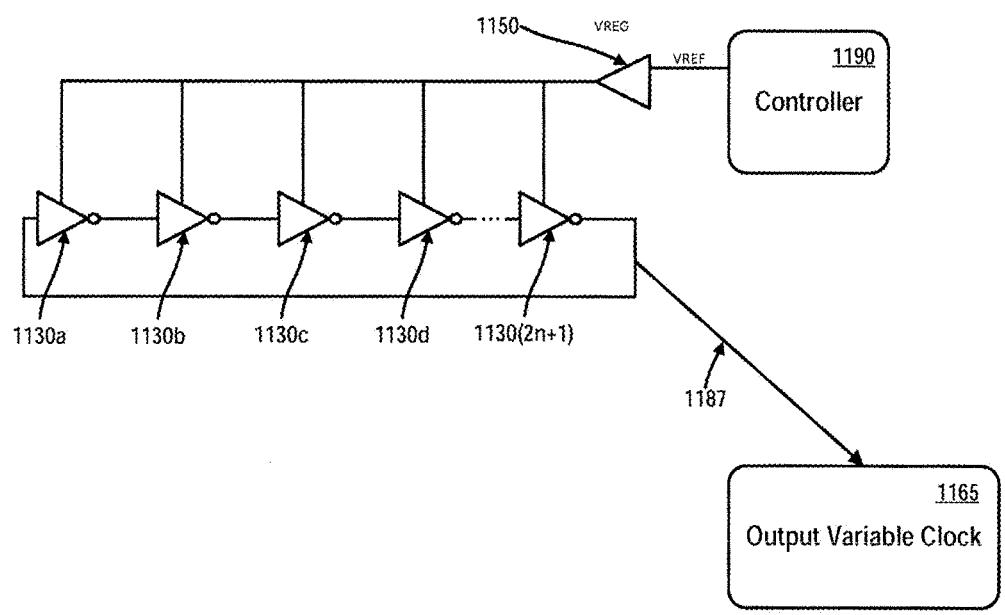
FIG. 11 is a circuit diagram illustrating an example system for generating clock period randomization including a controller, a reference voltage source, a voltage regulator, and an odd number of inverters in series according to an example embodiment.

There are numerous other possible implementations in addition to or instead of the example implementations described above and illustrated in FIGS. 3 and 4. For example, the elements providing the variable delay ($t_{VAR}$ 320) may be distributed more evenly around the ring by including a variable capacitor at each stage rather than only at an individual stage. In at least one other embodiment, the supply for the entire ring may be driven by a voltage regulator whose input reference varies on a cycle-by-cycle basis (e.g., as illustrated in FIG. 11 and described in greater detail below). Alternatively, the number of effective elements in the ring can be varied using a mux structure or a modified form of a synchronous mirror delay (e.g., as illustrated in FIG. 7 and described in greater detail below).

In accordance with one or more other embodiments, a phase interpolator may be used for varying the delay. In such an embodiment, a subset of the phase interpolator controls are set to a random or pseudorandom input rather than to a known pattern such as a ramp.

FIG. 10 is a circuit diagram illustrating a bank of linear capacitors 1050 that may be switched into or out of a circuit according to at least one embodiment. FIG. 10 includes switches $1030a$-$1030n$, signals $Sel_0$ through $Sel_{n-1}$, signals $\overline{Sel_0}$ through $\overline{Sel_{n-1}}$, linear capacitors $1040a$-$1040n$, input clock 1060, signal ground $1075a$-$1075n$, variable delay wire 1085, and controller 1090, wherein, in at least one embodiment, $n \geq 2$. Capacitors $440a$-$440d$ (FIG. 4) may be linear capacitors $1040a$-$1040n$; input clock 460 may be input clock 1060; signal ground $475a$-$475d$ may be signal ground $1075a$-$1075n$; variable delay wire 485 may be variable delay wire 1085; and/or controller 490 may be controller 1090, but the embodiments are not limited thereto. In at least one embodiment, while not depicted, other elements may be connected to delay wire 1085, e.g., inverters $430a$-$430d$, resistors $445a$-$445d$, and/or a logic gate 410. Controller 1090 may comprise a trim code generator 500 (FIG. 5), or be connected to a trim code generator 500 to receive at least one trim code from the trim code generator 500, and provides the at least one trim code to the linear capacitors $1040a$-$1040n$.

Controller 1090 provides a trim code comprising a signal (e.g. bit vector) either $Sel_i$ or $\overline{Sel_i}$, $0 \leq i \leq n-1$, to switches $1030a$-$1030n$ to switch each of the linear capacitors $1040a$-$1040n$ into or out of the circuit. The input clock 1060 and the controller 1090 may have a synchronous design such that the trim code is provided to the switches $1030a$-$1030n$ synchronously based on the input clock 1060.

In at least one embodiment, linear capacitors $1040a$-$1040n$ are analogous to a digital to time converter (DTC), of which various implementations are known to one having ordinary skill in the art.

In at least one embodiment, linear capacitors $1040a$-$1040n$ (or, in at least one embodiment, n sets of elements comprising linear capacitors $1040a$-$1040n$) may be identical (or "substantially identical" e.g. having a same part number or a same model number), in which case at least some trim codes in a set of trim codes applied to switches $1030a$-$1030n$ may be based on a unary coding (e.g. thermometer coding).

In at least one embodiment, linear capacitors $1040a$-$1040n$ (or, in at least one embodiment, n sets of elements comprising linear capacitors $1040a$-$1040n$) may be binary-weighted, in which case at least some trim codes in a set of trim codes are referred to herein as "binary-weighted trim codes" that increment as a binary number.

In at least one embodiment, linear capacitors $1040a$-$1040n$ (or, in at least one embodiment, n sets of elements comprising linear capacitors $1040a$-$1040n$) may be a combination of identical and binary-weighted linear capacitors (n sets of elements comprising linear capacitors), wherein the linear capacitors (n sets of elements comprising linear capacitors) corresponding to more significant bits are binary-weighted and are controlled by binary-weighted trim codes applied to the corresponding switches, and the linear capacitors corresponding to less significant bits are identical and are controlled by trim codes based on a unary coding.

Linear capacitors $1040a$-$1040n$ may be linear capacitors, but the embodiments are not limited thereto. For example, if capacitors in place of linear capacitors $1040a$-$1040n$ are based on a CMOS device with the source and drain shorted, the capacitance will be non-linear.

FIG. 11 is a circuit diagram illustrating an example system for generating clock period randomization including a controller, a reference voltage source, a voltage regulator, and an odd number of inverters in series according to an example embodiment. FIG. 11 includes inverters $1130a$-$1130(2n+1)$, voltage regulator 1150, controller 1190, output variable clock wire 1187, output variable clock 1165, and reference voltage VREF. In FIG. 11, the supply for the entire ring may be driven by a voltage regulator 1150 whose input reference VREF varies on a cycle-by-cycle basis. The ring includes an odd number of inverters in series, i.e. the number of inverters in the ring is $2n+1$, $n>0$. All stages in the ring are driven by voltage regulator 1150. The stages are depicted as inverters, but the embodiments are not limited thereto. The output from voltage regulator 1150 is controlled by a reference signal VREF provided by the controller 1190. VREF may be driven by a digital to analog converter (DAC) whose input changes periodically to produce the periodic variation; in this embodiment, the controller 1190 may include the DAC. In at least one other embodiment, the voltage regulator 1150 may include the DAC functionality; in this embodiment, the voltage regulator 1150 may have a digital voltage control input.

FIG. 5 illustrates an example system for generating trim codes. FIG. 5 includes trim code generator 500, random number generator 530, seed 543, m-bit pseudorandom binary sequence generator 515, logic gate 510, a shift register comprising flip flops $520a$-$520m$, modular arithmetic calculator 512, a register bank comprising registers $540a$-$540p$, and mux 550. The register bank comprising registers $540a$-$540p$ may include 16 registers, but the embodiments are not limited thereto. The number of registers 540 in the register bank may be chosen by an implementer having ordinary skill in the art based on design parameters or preferences.

In accordance with at least one embodiment, the trim code generator 500 outputs trim codes using pseudorandomness to determine which trim code from a set of trim codes should be output. In an example embodiment, the trim codes may be for the control of a capacitor array forming part of an oscillator. In general, the approach of the trim code generator 500 is not to know in hardware how much to vary the frequency, but simply to randomly select from a set of programmable trim codes such that the result from the application of the trim codes to a target circuit centers on a desired frequency.

In an example embodiment, random number generator 530 provides a seed 543 to the m-bit pseudorandom binary sequence generator 515, and the m-bit pseudorandom binary sequence generator 515 provides a m-bit pseudorandom binary sequence (mPRBS) to the modular arithmetic calculator 512.

There are several ways in which the m-bit pseudorandom binary sequence generator 515 may be updated. If the mPRBS output by the m-bit pseudorandom binary sequence generator 515 is of sufficient length, it may be sufficient to update the seed 543 to the m-bit pseudorandom binary sequence generator 515 only once per cryptographic routine. In at least one other embodiment, the seed 543 could be updated periodically under control of a finite state machine.

The modular arithmetic calculator 512 may determine mPRBS mod $\lambda$, where $\lambda$ is a positive integer. The value determined by the modular arithmetic calculator 512 is provided to the mux 550 to control the mux 550 such that the value held in a certain register of the register bank comprising registers 540a-540p will be provided as an output from the mux 550. In an example embodiment, the output from the mux 550 may be provided as a control signal to the controller 490 (FIG. 4) to control the clock period randomizer 450. In another embodiment, the output of the mux 550 may be provided as a control signal to the controller 1090 (FIG. 10) to control the bank of linear capacitors 1050 which in turn may be part of the clock period randomizer 450.

In an example embodiment, the random number generator 530 is implemented as a true random number generator. In an example embodiment, the m-bit pseudorandom binary sequence generator 515 is implemented as a linear feedback shift register (LFSR). In an example embodiment, the value of m is chosen such that a desired level of pseudorandomness is achieved. While logic gate 510 is depicted as a XNOR gate, a person having ordinary skill in the art will recognize that the embodiments of the m-bit pseudorandom binary sequence generator 515 are not limited thereto. There are many ways to implement a LFSR, and the logic gate(s) included in the LFSR may be other than a XNOR gate.

In an example embodiment, λ is equal to the number of registers 540a-540p in the register bank connected to the mux 550. In an example embodiment, the modular arithmetic calculator 512 determines mPRBS mod 16. In an example embodiment, the values held in the registers 540a-540p are the trim codes that may be supplied to the controller 490. An implementer having ordinary skill in the art will recognize that the number of possible trim codes supplied to the controller 490 may depend on how the variable capacitor array in the clock period randomizer 450 is implemented. In an example embodiment, the clock period randomizer 450 may include a number of switches (e.g. 1030a-1030n (FIG. 10)) which switch the capacitors 440a-440d (or 1040a-1040n), and the set of switches may have a number σ of states permissible (e.g. useful or effective or legal) for the operation of the clock period randomizer 450. In an example embodiment, σ registers 540a-540p may be desired.

Figure 6:
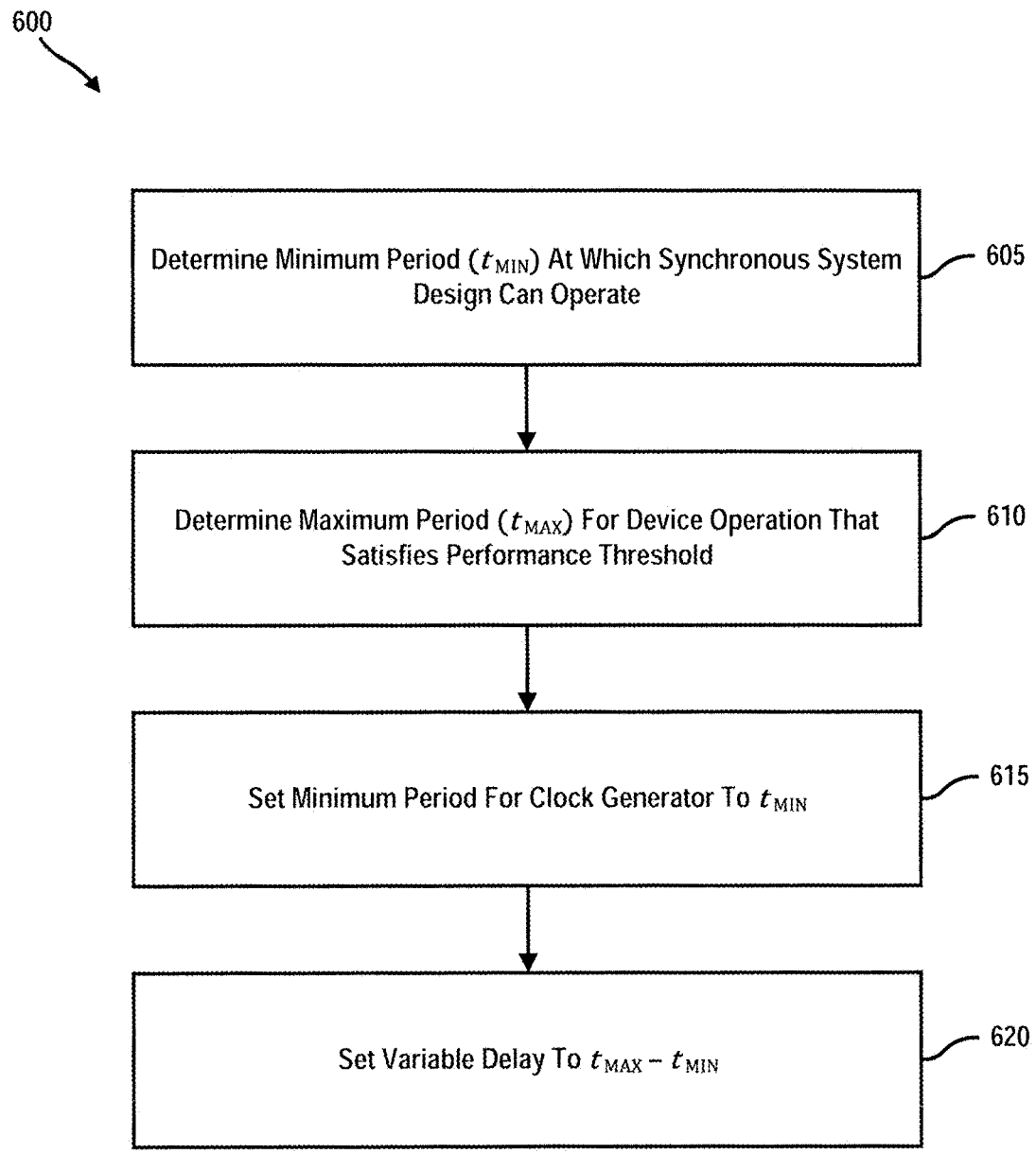
FIG. 6 is a flowchart illustrating an example method for generating clock period randomization according to one or more embodiments described herein.

FIG. 6 illustrates an example method 600 for generating clock period randomization. In accordance with at least one embodiment described herein, the process 600 may include blocks 605 through 620. However, in accordance with one or more other embodiments of the present disclosure, the example process 600 may include one or more other steps or operations in addition to or instead of those illustrated in FIG. 6 and described in greater detail below.

At block 605, a determination may be made as to the minimum period of time ($t_{MIN}$) at which the synchronous system can operate. For example, a synchronous system design contains some critical path which sets the maximum operating frequency ($f_{MAX}$) for the system. A clock in a synchronous system running above $f_{MAX}$ will eventually produce an incorrect result under some set of data inputs and environmental conditions. Observe that $$t_{MIN} = \frac{1}{f_{MAX}}.$$

A maximum operating frequency $f_{MAX}$ may be based on a specification for a CPU, ASIC, or other integrated circuit that executes the cryptographic algorithm and receives the output variable clock 365, 465, or 1165.

At block 610, a determination may be made as to the maximum period of time ($t_{MAX}$) at which the overall device can operate while maintaining a certain performance level (e.g., satisfying a performance threshold).

The maximum period of time $t_{MAX}$ may be depend on design preferences. If the complexity of the cryptographic algorithm is relatively low, and the cryptographic algorithm is executed on an ASIC as opposed to a general purpose processor, then $t_{MAX}$ will be relatively low, but the ASIC may cost more than executing the cryptographic algorithm on the general purpose processor. On the other hand, if the complexity of the cryptographic algorithm is relatively high, and the cryptographic algorithm is executed on a general purpose processor, $t_{MAX}$ is of greater importance to design preferences and parameters because the execution of the cryptographic algorithm driven by the output variable clock 365, 465, or 1165 will require relatively more time.

At block 615, the minimum period of time for the clock period may be set to the minimum period of time ($t_{MIN}$) at which the synchronous system design can operate (determined at block 605).

At block 620, the variation in the clock period may be set to the difference between the maximum period determined at block 610 and the minimum period determined at block 605, or ($t_{MAX}$)-($t_{MIN}$).

FIG. 7 illustrates an example system 700 for generating clock period randomization including a synchronous mirror delay (SMD). In an example embodiment, the fixed delay $t_{FIXED}$ 310 is provided by $t_{FIXED}$ generator 710. In accordance with at least one embodiment described herein, $t_{FIXED}$ generator 710 may be implemented using inverters with capacitive or RC loading. However, in accordance with one or more other embodiments, $t_{FIXED}$ generator 710 may be implemented with any circuit that generates delay. In the example illustrated, $t_{FIXED}$ generator 710 also generates the inversion for the oscillator, though this functionality could also be provided elsewhere in the ring.

The variable portion of the delay ($t_{VAR}$ 320 FIG. 3) may be selected using the Select signals $Sel_0$, $Sel_1$, ..., $Sel_n$ (where n is the number of full mirror delay stages). Each of the tau (τ) delay generators 720 has a fixed delay. Selecting a given signal $Sel_i$ high results in a variable delay of $2\tau i$ (assuming each tau (τ) delay generator 720 is implemented to provide the same amount of delay). In an example embodiment, the selecting of a given signal $Sel_i$ high may be done by a mux 730i receiving the Select signal. By making the selection of i random or pseudorandom, the overall delay of the oscillator will vary randomly or pseudorandomly between $t_{FIXED}$ and $t_{FIXED}+2\tau n$.

In an example embodiment, a mux 730i and the circuitry comprising the tau (τ) delay generators 720 it switches into and out of the circuit may be referred to as a delay unit.

In an example embodiment, controller 790 provides the Select signals $Sel_0$, $Sel_1$, ..., $Sel_n$. In an example embodiment, the controller 790 is the trim code generator 500. In an example embodiment, the controller 790 is the trim code generator 500 wherein the output of mux 550 is a bit vector of length n. In an example embodiment, the controller 790 is the trim code generator 500 having σ registers 540a-540p, wherein the number of legal states selected by the Select signals is σ.

Although the example in FIG. 7 shows discrete multiplexers, it should be noted that numerous other arrangements that loop back the forward path to the reverse path may be considered equivalent.

Figure 8:
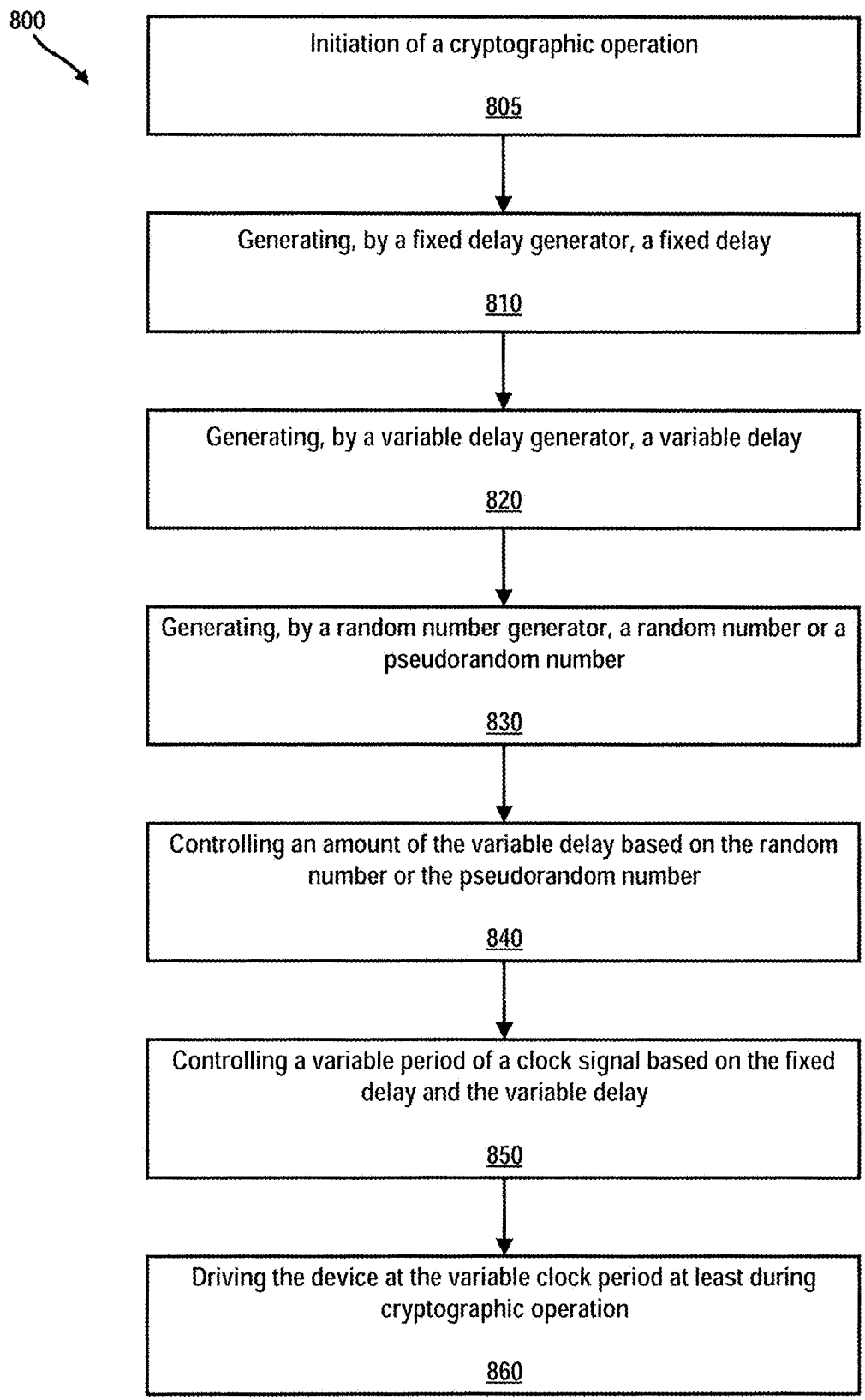
FIG. 8 is a block diagram illustrating a method of generating a variable clock period for a device clock signal at least during a cryptographic operation to defend against a cryptographic attack according to an example embodiment.

FIG. 8 is a block diagram illustrating a method 800 of generating a variable clock period for a clock signal of a device at least during a cryptographic operation to defend against a cryptographic attack according to an example embodiment. FIG. 8 begins with the initiation (805) of a cryptographic operation. It is not required that an embodiment of the clock period randomizer described herein initiate the cryptographic operation; a device or unit other than the clock period randomizer may initiate the cryptographic operation. If the cryptographic operation is implemented in software, the software may trigger (e.g. cause) the clock period randomizer to commence a variable clock period that varies randomly to produce an output variable clock driving a device at a random clock rate at least during the cryptographic operation. If the cryptographic operation is implemented in hardware for cryptographic operation (e.g. on a ASIC for cryptographic operation, a security or cryptographic co-processor, etc.), initiation of the hardware for cryptographic operation may trigger (e.g. cause) the clock period randomizer to commence a variable clock period that varies randomly to produce an output variable clock driving a device at a random clock rate at least during the cryptographic operation. Generally, any other conventional or known means to determine that cryptographic operations will initiate or are initiating may be supplemented with logic to trigger (e.g. cause) the clock period randomizer to commence a variable clock period that varies randomly to produce an output variable clock driving a device at a random clock rate at least during the cryptographic operation.

The clock period randomizer commences operation.

First, a fixed delay generator generates (810) a fixed delay. The fixed delay generator may comprise a RC circuit, such as the portion of clock period randomizer 450 that includes resistors 415a-415d, inverters 420a-420d, and capacitors 425a-425d. In at least one other embodiment, the fixed delay generator may comprise $t_{FIXED}$ generator 710. In at least one other embodiment, $t_{FIXED}$ may be a temporal component in the time between pulses of VREF of FIG. 11. In at least one other embodiment, $t_{FIXED}$ may be a temporal component in the time between digital signals from the digital voltage control input in embodiments of FIG. 11 wherein the voltage regulator 1150 includes the DAC functionality.

Second, a variable delay generator generates (820) a variable delay. The variable delay generator may include inverters 430a-430d, resistors 445a-445d, and variable capacitors 440a-440d and may receive a trim code from the trim code generator 500. In at least one embodiment, the variable delay generator may include tau (τ) delay generators 720 and muxes 7300-730n and may receive a signal from controller 790. In at least one embodiment, the variable delay generator may include switches 1030a-1030n and capacitors 1040a-1040n and may receive from the controller 1090 a trim code generated by the trim code generator 500. In at least one embodiment, the variable delay $t_{VAR}$ may be a randomly or pseudorandomly varying temporal component in the time between pulses of VREF of FIG. 11. In at least one other embodiment, $t_{VAR}$ may be a randomly or pseudorandomly varying temporal component in the time between digital signals from the digital voltage control input in embodiments of FIG. 11 wherein the voltage regulator 1150 includes the DAC functionality.

Third, a random number generator generates (830) a random number or a pseudorandom number. The random number generator may be the random number generator 50 or 530.

Fourth, an amount of the variable delay is controlled (840) based on the random number or the pseudorandom number. The amount of the variable delay may be controlled, based on the random number or the pseudorandom number, by the trim code generator 500 and the controller 490, 790, or 1090. The amount of the variable delay may be controlled, based on the random number or the pseudorandom number, by the controller 1190. The amount of the variable delay may be controlled, based on the random number or the pseudorandom number, by the voltage regulator 1150 which receives a digital signal, wherein the voltage regulator 1150 includes the DAC functionality.

Fifth, a variable period of a clock signal is controlled (850) based on the fixed delay and the variable delay. The variable period of the clock signal may be controlled, based on the fixed delay and the variable delay, by the trim code generator 500 and the controller 490, 790, or 1090. In at least one embodiment, the variable period of the clock signal may be controlled, based on the fixed delay and the variable delay, by the controller 1190. In at least one embodiment, the variable period of the clock signal may be controlled, based on the fixed delay and the variable delay, by the voltage regulator 1150 which receives a digital signal, wherein the voltage regulator 1150 includes the DAC functionality.

Sixth, the device is driven (860) at the variable clock period at least during cryptographic operation. The device may be driven by the output variable clock 365, 465, or 1165.

Figure 9:
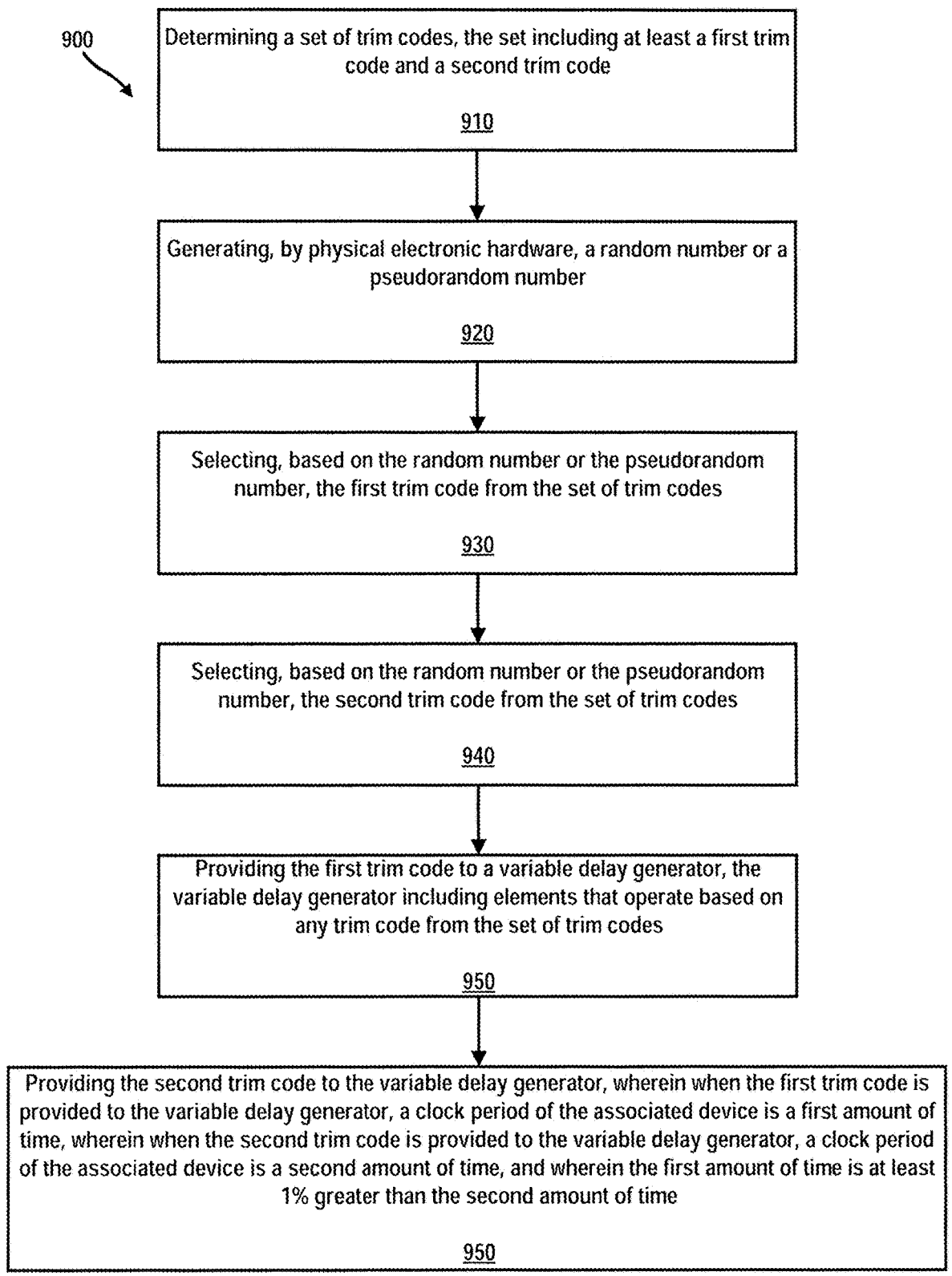
FIG. 9 is a block diagram illustrating a method of randomizing a clock period for a clock of an associated device at least during a cryptographic operation to defend against a cryptographic attack according to an example embodiment.

FIG. 9 is a block diagram illustrating a method 900 of randomizing a clock period for a clock of an associated device at least during a cryptographic operation to defend against a cryptographic attack according to an example embodiment. First, a set of trim codes is determined (910), the set including at least a first trim code and a second trim code. The set of trim codes may be generated or determined by the trim code generator 500. The set of trim codes may be determined by a person having ordinary skill in the art based on the number(s) of bits each trim code in the set of trim code may comprise. Factors relevant to the number(s) of bits each trim code in the set of trim code may include the number of elements which the trim codes are used to control and the number of desired or permissible states of the elements which the trim codes are used to control.

Second, physical electronic hardware generates (920) a random number or a pseudorandom number. The random number or the pseudorandom number may be generated by the random number generator 50 or 530.

Third, the first trim code is selected (930) from the set of trim codes based on the random number or the pseudorandom number. The first trim code from the set of trim codes may be selected, based on the random number or the pseudorandom number, by the trim code generator 500, including m-bit pseudorandom binary sequence generator 515, logic gate 510, shift register comprising flip flops 520a-520m, modular arithmetic calculator 512, a register bank comprising registers 540a-540p, and mux 550.

Fourth, the second trim code is selected (940) from the set of trim codes based on the random number or the pseudorandom number. The second trim code from the set of trim codes may be selected, based on the random number or the pseudorandom number, by the trim code generator 500, including m-bit pseudorandom binary sequence generator 515, logic gate 510, shift register comprising flip flops 520a-520m, modular arithmetic calculator 512, a register bank comprising registers 540a-540p, and mux 550.

Fifth, the first trim code is provided (950) to a variable delay generator, the variable delay generator including elements that operate based on any trim code from the set of trim codes. In at least one embodiment, the set of trim codes may include only the trim codes for permissible states; in at least one embodiment, not all permutations of a bit vector of a certain length may be trim codes for permissible states because some permutations, when applied, may result in configurations (e.g. hardware configurations or switch configurations) which are not useful, desired, effective, and/or legal. The variable delay generator may include inverters 430a-430d, resistors 445a-445d, and variable capacitors 440a-440d and may receive the first trim code and the second trim code from the trim code generator 500. In at least one embodiment, the variable delay generator may include tau (τ) delay generators 720 and muxes 7300-730n and may receive a signal from controller 790, the signal comprising the first trim code and the second trim code. In at least one embodiment, the variable delay generator may include switches 1030a-1030n and capacitors 1040a-1040n and may receive from the controller 1090 the first trim code and the second trim code. In at least one embodiment, the variable delay $t_{VAR}$ may be a randomly or pseudorandomly varying temporal component in the time between pulses of VREF of FIG. 11, and the random or pseudorandom variance may be a function of the first trim code or and the second trim code, the function determined or calculated by logic comprising integrated circuitry or by the controller 1190. In at least one other embodiment, $t_{VAR}$ may be a randomly or pseudorandomly varying temporal component in the time between digital signals from the digital voltage control input in embodiments of FIG. 11 wherein the voltage regulator 1150 includes the DAC functionality, and the digital signals are a function of the first trim code or the second trim code or comprise the first trim code or the second trim code.

Sixth, the second trim code is provided (960) to the variable delay generator, wherein when the first trim code is provided to the variable delay generator, a clock period of the associated device is a first amount of time, wherein when the second trim code is provided to the variable delay generator, a clock period of the associated device is a second amount of time, and wherein the first amount of time is at least 1% greater than the second amount of time.

As used herein, a "cryptographic operation" comprises an operation included in a cryptographic algorithm A "cryptographic operation" further comprises an operation on a private key. Cryptographic algorithms include, but are not limited to, the algorithms provided in Federal Information Processing Standards Publication 202 (SHA-3 standard) and Federal Information Processing Standards Publication 197 (AES standard).

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In accordance with at least one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
a processor configured to be driven by a randomized clock signal; and
a variable clock configured to generate the randomized clock signal from a received input clock signal, the variable clock comprising:
a variable delay generator comprising a phase interpolator configured to produce a variable delay amount;
a fixed delay generator configured to generate a fixed delay amount;
circuitry configured to combine the fixed delay amount and the variable delay amount to create a combined delay amount; and
an output configured to generate the randomized clock signal responsive to the combined delay amount elapsing since receiving the input clock signal.

2. The system of claim 1, further comprising an input clock configured to produce the input clock signal.

3. The system of claim 1, wherein the system comprises an integrated circuit, chip, or system-on-chip.

4. The system of claim 1, wherein the phase interpolator has at least one control input.

5. The system of claim 4, wherein the phase interpolator is further configured to adjust the variable delay amount based on one or more inputs received via the control input.

6. The system of claim 5, wherein the phase interpolator is further configured to adjust the variable delay amount based on a random number received via the control input.

7. The system of claim 6, further comprising a random number generator coupled to the control input and configured to generate the random number.

8. A system comprising:
a processor configured to be driven by a randomized clock signal;
processor-readable storage media comprising instructions that, when executed by the processor, cause the system to perform, according to the randomized clock signal, one or more operations; and
a variable clock configured to generate the randomized clock signal from a received input clock signal, the variable clock comprising:
a variable delay generator comprising a phase interpolator configured to produce a variable delay amount;
a fixed delay generator configured to generate a fixed delay amount;

circuitry configured to combine the fixed delay amount and the variable delay amount to create a combined delay amount; and an output configured to generate the randomized clock signal responsive to the combined delay amount elapsing since receiving the input clock signal.

9. The system of claim 8, further comprising an input clock configured to produce the input clock signal.

10. The system of claim 8, wherein the system is a computing device or communication device.

11. The system of claim 8, wherein the variable clock is configured to prevent a fault injection attack on the system.

12. The system of claim 8, wherein the operations comprise an advanced encryption standard (AES) or secure hash algorithm (SHA) operation.

13. The system of claim 8, wherein the operations comprise determining at least a portion of a cryptographic key based on the combined delay amount.

14. The system of claim 8, further comprising a random number generator coupled to the phase interpolator,
wherein the variable delay amount is based on a random number received by the phase interpolator from the random number generator.

15. The system of claim 8, wherein the operations comprise a cryptographic operation.

16. The system of claim 15, wherein the operations comprise a key branch or jump instruction.

17. The system of claim 8, wherein:
the system has a minimum clock period; and
the variable clock is further configured to generate the randomized clock signal such that the combined delay meets the minimum clock period.

18. The system of claim 17, wherein the fixed delay amount corresponds to the minimum clock period.

19. The system of claim 8, wherein:
the system has maximum clock period corresponding to a performance threshold; and
the variable clock is further configured to generate the randomized clock signal such that the combined delay amount meets the maximum clock period.

20. The system of claim 19, wherein the phase interpolator is further configured to vary the variable delay from zero to a difference between the fixed delay amount and the maximum clock period.

* * * * *